US011562488B2

(12) United States Patent
Kumawat et al.

(10) Patent No.: US 11,562,488 B2
(45) Date of Patent: Jan. 24, 2023

(54) IMAGE CONTENT SNAPPING GUIDELINES

(71) Applicant: Adobe Inc., San Jose, CA (US)

(72) Inventors: Nirmal Kumawat, Noida (IN); Shikhar Garg, New Delhi (IN); Saikat Chakrabarty, Noida (IN); Sourabh Gupta, Noida (IN); Mrinal Kumar Sharma, Hazaribagh (IN); Gourav Singhal, Delhi (IN)

(73) Assignee: Adobe Inc., San Jose, CA (US)

( * ) Notice: Subject to any disclaimer, the term of this patent is extended or adjusted under 35 U.S.C. 154(b) by 238 days.

(21) Appl. No.: 17/071,157

(22) Filed: Oct. 15, 2020

(65) Prior Publication Data
US 2022/0122258 A1 Apr. 21, 2022

(51) Int. Cl.
*G06T 7/11* (2017.01)
*G06T 7/13* (2017.01)
*G06T 7/194* (2017.01)

(52) U.S. Cl.
CPC .................. *G06T 7/11* (2017.01); *G06T 7/13* (2017.01); *G06T 7/194* (2017.01)

(58) Field of Classification Search
CPC .............. G06T 7/11; G06T 7/13; G06T 7/194
See application file for complete search history.

(56) References Cited

U.S. PATENT DOCUMENTS

| | | | | |
|---|---|---|---|---|
| 10,002,442 B1* | 6/2018 | Dagley | ..................... | G06T 7/73 |
| 2004/0133379 A1* | 7/2004 | Kobayashi | .............. | G06F 3/012 |
| | | | | 702/127 |
| 2007/0038944 A1* | 2/2007 | Carignano | ............ | G06T 19/006 |
| | | | | 715/757 |
| 2009/0249239 A1* | 10/2009 | Eilers | .................... | G06F 3/0486 |
| | | | | 715/769 |
| 2011/0063295 A1* | 3/2011 | Kuo | ........................ | G06T 15/60 |
| | | | | 345/426 |
| 2017/0270562 A1* | 9/2017 | Ben-Rubi | ............. | G06F 16/435 |
| 2017/0360533 A1* | 12/2017 | Choi | ................... | G06F 3/04842 |

(Continued)

OTHER PUBLICATIONS

Löffler et al. ("Snapping Graph Drawings to the Grid Optimally," arXiv:1608.08844v1; Aug. 31, 2016) (Year: 2016).*

(Continued)

*Primary Examiner* — Yubin Hung
(74) *Attorney, Agent, or Firm* — FIG. 1 Patents

(57) ABSTRACT

In implementations of image content snapping guidelines, a guidelines segmentation system includes modules, such as an image pre-processing module to reduce the image size of a digital image if the image size exceeds an image size threshold. An object segmentation module segments objects depicted in the digital image and identifies each object by a bounding border that delineates an object region boundary. An edge detection module receives a segmented object and determines object external edges and object feature edges from the segmented object, and identifies object corners of the object. A snapping guidelines module determines image content snapping guidelines of an object depicted in the digital image, the image content snapping guidelines for an object determined based on the bounding border of the object region boundary, the object external edges, the object feature edges, and projected snapping guidelines that extend from the object corners of the object.

20 Claims, 10 Drawing Sheets

(56) References Cited

U.S. PATENT DOCUMENTS

2018/0373679 A1* 12/2018 Ranjan .................. G06F 40/103

OTHER PUBLICATIONS

Tao et al. ("An Object Detection System Based on YOLO in Traffic Scene," 6th International Conference on Computer Science and Network Technology, Oct. 21-22, 2017) (Year: 2017).*
Bochkovskiy et al. ("YOLOv4: Optimal Speed and Accuracy of Object Detection," arXiv:2004.10934v1) (Year: 2004).*
"Bilateral filter—Wikipedia", Retrieved at: https://en.wikipedia.org/wiki/Bilateral_filter—on May 26, 2020, 4 pages.
"Canny edge detector—Wikipedia", Retrieved at: https://en.wikipedia.org/wiki/Canny_edge_detector—on May 26, 2020, 10 pages.
"Line detection—Wikipedia", Retrieved at: https://en.wikipedia.org/wiki/Line_detection—on May 26, 2020, 4 pages.
"Removing clutter from images", Retrieved at: https://people.uwec.edu/walkerjs/DSP/Denoising%20images.htm—on May 26, 2020, 1 page.
"YOLO-v4 Is The New State-of-the-art Object Detector", Retrieved at: https://neurohive.io/en/news/yolo-v4-is-the-new-state-of-the-art-object-detector/, Apr. 29, 2020, 7 pages.
Sharma, Pulkit, "Computer Vision Tutorial: A Step-by-Step Introduction to Image Segmentation Techniques (Part 1)", Retrieved at: https://www.analyticsvidhya.com/blog/2019/04/introduction-image-segmentation-techniques-python/—on May 26, 2020, Apr. 1, 2019, 43 pages.

\* cited by examiner

IMAGE CONTENT SNAPPING GUIDELINES

BACKGROUND

Generally, graphic designers or other similar computer users utilize computer-based image editing and graphics design software applications to develop many different types of digital artworks, such as images that are designed for posters, magazine pages, flyers, book pages, advertisements, and any other type of design documents. Text and other image objects are often incorporated over the images of the digital artworks. For example, text may be added to an image to enhance the image and/or to add more context to the visual content of the image. Further, text added to an image may not be added in just a horizontal or vertical alignment, but rather, a designer may want to align the text along the edges of an object depicted in a digital image, where the edges of the object align with any angle between parallel (0 degrees) and perpendicular (90 degrees).

However, positioning and aligning text or other image objects with the objects depicted in a digital artwork can be difficult for a designer to place in accurate alignment. Notably, a graphic designer can incur significant development time and effort to align text with the edge lines of an object depicted in a digital artwork, particularly when the edge lines of the object do not appear parallel or perpendicular in the digital artwork. Some conventional techniques will take into account an outer bounding box of a digital image that is formatted as a vector-based image. However, many graphic designers work with digital images that are formatted as raster-based graphics, and there are no techniques to determine text and/or object alignment guidelines as related to objects depicted in raster-based graphics and digital images.

SUMMARY

This Summary introduces features and concepts of image content snapping guidelines, which is further described below in the Detailed Description and shown in the Figures. This Summary should not be considered to describe essential features of the claimed subject matter, nor used to determine or limit the scope of the claimed subject matter.

Aspects of image content snapping guidelines are described. In implementations, a computing device includes a guidelines database that maintains image content snapping guidelines corresponding to features of one or more objects depicted in a digital image, such as a digital image formatted as a raster-based graphic. The computing device implements a guidelines segmentation system, which includes modules and/or components to implement aspects of the techniques for image content snapping guidelines. An image pre-processing module receives the digital image as an input image, determines an image size of the digital image, and reduces the image size of the digital image to an image size threshold if the image size exceeds the image size threshold. An object segmentation module segments the one or more objects depicted in the digital image, and each of the one or more objects are identified by a bounding border that delineates an object region boundary of a respective object.

The guidelines segmentation system also includes an edge detection module that receives segmented objects of each of the one or more objects identified in the digital image. The edge detection module determines object external edges and object feature edges from the segmented object for each of the one or more objects, as well as identifies object corners of the one or more objects. In implementations, the edge detection module determines the object external edges as approximate straight-line external edges around the object within the bounding border of the object region boundary. Additionally, the edge detection module determines the object feature edges as approximate straight-line feature edges of the object.

The guidelines segmentation system also includes a snapping guidelines module that determines the image content snapping guidelines for each of the one or more objects depicted in the digital image. The image content snapping guidelines for an object are determined based on the bounding border of the object region boundary, the object external edges, the object feature edges, and projected snapping guidelines that extend from the object corners of an object. In implementations, bounding border snapping guidelines are determined as horizontal and vertical snapping guidelines corresponding to edges of the bounding border of an object region boundary for an object. Additionally, the snapping guidelines module determines external edge snapping guidelines corresponding to the object external edges around the object, determines the feature edge snapping guidelines corresponding to the object feature edges of the object, and can determine background feature snapping guidelines.

BRIEF DESCRIPTION OF THE DRAWINGS

Implementations of image content snapping guidelines are described with reference to the following Figures. The same numbers may be used throughout to reference similar features and components that are shown in the Figures.

DETAILED DESCRIPTION

Figure 1:
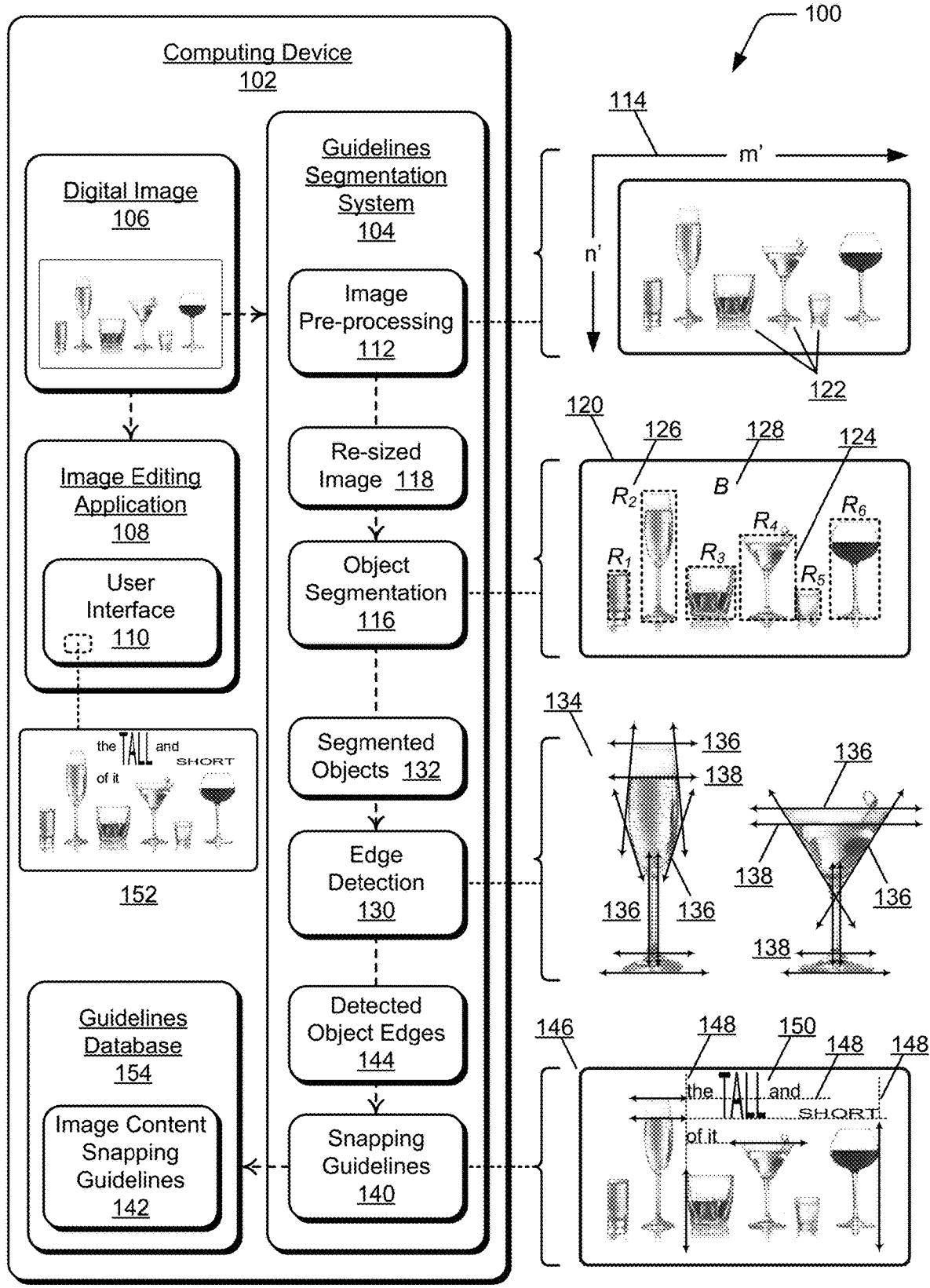
FIG. 1 illustrates an example of a computing device that can implement aspects of the techniques for image content snapping guidelines.

Implementations of image content snapping guidelines are described, and provide techniques to identify and generate snapping guidelines from object contours determined as object external edges and object feature edges of image content depicted in a digital image. Generally, a guidelines segmentation system implements a combination of object segmentation, edge detection, and snapping guideline generation techniques to identify the object contours as object external edges and object feature edges of objects depicted in a digital image, and then generate image content snapping guidelines that correspond to the detected edges of an object. A graphic designer working in an image editing application can then utilize the image content snapping guidelines to facilitate positioning text objects and shape objects on a digital image in alignment with the features, contours, and edges of the objects depicted in the digital image. Notably, the features of image content snapping guidelines described herein enable designers who work with digital images that are formatted as raster-based graphics to identify object edges and generate the image content snapping guidelines without having to manually initiate generating a vector-based image from a raster-based image.

Generally, there is no current system or technique to automatically determine the edges of an object in a digital image from which snapping guidelines can be determined to facilitate a user placing text or other shape object snapped along an object edge based on a snapping guideline. Many graphic designers work with digital images that are formatted as raster-based graphics in image editing applications, such as computer-based image editing and graphics design software applications. The raster-based graphics and images are structured by pixels, which do not provide clearly defined boundaries of the object features and edges depicted in a raster-based digital image.

An alternative approach is to vectorize an entire raster-based graphic and then generate all of the vectors that describe the structure of a vector-based image. However, this approach has latency and accuracy deficiencies, and uses the color information of the pixels in the raster-based graphic to vectorize the image. Notably, the complexity increases and the accuracy of this approach decreases with the number of colors. Even with a minimum number of colors specified, this comprehensive image-tracing approach is not performant or efficient, and can fail to provide accurate, detectable object and feature edges depicted in an image. Further, a vectorization technique may provide misleading results and generate false positives as vectors that do not contribute to the detectable object and feature edges.

The techniques for image content snapping guidelines include a guidelines segmentation system that receives an input of a digital image depicting one or more objects as image content, and the digital image may be formatted as a raster-based graphic image. An image pre-processing module of the guidelines segmentation system reduces an image size of the digital image if the image size exceeds an image size threshold. An object segmentation module of the guidelines segmentation system segments the objects depicted in the digital image, and generates a bounding border that delineates an object region boundary of each of the respective objects depicted in the digital image. An edge detection module of the guidelines segmentation system is utilized to identify background features in the digital image that are not otherwise detected and segmented by the object segmentation.

The edge detection module receives a segmented object generated for each of the respective objects identified in the digital image, and determines object external edges and object feature edges from the segmented object, and identifies object corners of the corresponding object. A snapping guidelines module of the guidelines segmentation system then determines the image content snapping guidelines for each of the objects depicted in the digital image. The image content snapping guidelines for an object are determined based on the bounding border of the object region boundary, the object external edges, the object feature edges, and projected snapping guidelines that extend from the object corners of the object.

Additionally, the snapping guidelines module can also determine background feature snapping guidelines based on the background features identified by the edge detection module. In implementations, the snapping guidelines module determines the bounding border snapping guidelines as horizontal and vertical snapping guidelines corresponding to edges of the bounding border of the object region boundary. The snapping guidelines module also determines the external edge snapping guidelines corresponding to the object external edges around the object, and determines the feature edge snapping guidelines corresponding to the object feature edges of the object.

While features and concepts of image content snapping guidelines can be implemented in any number of different devices, systems, networks, environments, and/or configurations, implementations of image content snapping guidelines are described in the context of the following example devices, systems, and methods.

FIG. 1 illustrates an example 100 of a computing device 102 that can implement aspects of the techniques for image content snapping guidelines, as described herein. The computing device 102 implements features of a guidelines segmentation system 104 to generate and utilize image content snapping guidelines as determined from the image content depicted in a digital image 106. The computing device 102 can be implemented as any type of consumer electronic device, computing device, client device, mobile device, mobile phone, tablet device, communication, entertainment, gaming, media playback, and/or other type of electronic and/or computing device. In this example 100, the computing device 102 may include any number and combination of different components as further described with reference to the example device shown in FIG. 12. Generally, the computing device 102 includes a memory and a processor, as well as a display device to display the digital image 106.

In this example 100, the computing device 102 includes an image editing application 108, which a designer may use to graphically edit, design, and/or enhance digital images, such as the digital image 106, which displays in a user interface 110 of the image editing application 108 on the display device of the computing device. The image editing application 108 is an example of any type of a computer-based image editing and graphics design software application that a designer (e.g., computer user) may use to edit and design raster-based graphics, such as the digital image 106.

The computing device 102 implements the guidelines segmentation system 104, which can be implemented as one or more modules that include independent processing, memory, and/or logic components functioning as a computing and/or electronic device integrated with the computing device 102. Alternatively or in addition, the guidelines segmentation system 104 can be implemented in software, in hardware, or as a combination of software and hardware components. In this example 100, the guidelines segmentation system 104 is implemented as software applications, components, or modules, such as executable software instructions (e.g., computer-executable instructions) that are executable with a processing system (e.g., a processor, graphics processor, and the like) of the computing device 102 to implement aspects of the described techniques for image content snapping guidelines.

As software applications, modules, or components, the guidelines segmentation system 104 can be stored in memory of the device (e.g., in the device memory), or in any other suitable memory device or electronic data storage implemented with the guidelines segmentation system. Alternatively or in addition, the guidelines segmentation system 104 may be implemented in firmware and/or at least partially in computer hardware. For example, at least part of the guidelines segmentation system 104 may be executable by a computer processor, and/or at least part of the guidelines segmentation system may be implemented in logic circuitry.

In implementations, the guidelines segmentation system 104 receives the digital image 106 as an input image, such as by user selection of the image displayed in the user interface 110 of the image editing application 108. The guidelines segmentation system 104 can receive the digital image 106 as the input and utilize image pre-processing 112 (e.g., an image pre-processing module or component), which determines the current image size of the digital image 106. If the current image size exceeds an image size threshold, the image pre-processing 112 reduces the image size of the digital image 106 down to at least the image size threshold.

In this example 100, the digital image 106 is formatted as a raster-based graphic of size m-pixels by n-pixels ("m×n"), and the size of the digital image is determined by the image pre-processing 112 based on the number of pixels that makeup the image. For example, the digital image 106 is scaled down dependent on the original pixel dimensions of the image ("m×n"). If either of the m-dimension or the n-dimension is greater than the image size threshold (e.g., 250 pixels), then the larger of the dimensions is reduced or scaled-down to the image size threshold, notably while maintaining the aspect ratio of the image. For example, as shown at 114, if the original size of the digital image 106 has dimensions of 1000×500 pixels, then the image pre-processing 112 will reduce the larger dimension (m=1000) scaled down to m'=250 pixels, and the scaled pixel dimensions (m'×n') of the image will be 250×125 pixels. Notably, initially reducing or scaling-down the size of the digital image 106 prior to subsequent object segmentation and edge detection is performed without any loss of information that defines and/or describes the digital image.

The guidelines segmentation system 104 also implements object segmentation 116 (e.g., an object segmentation module or component), which receives the digital image 106, or the re-sized digital image 118 that has been scaled-down based on the image pre-processing. The object segmentation 116 is utilized to identify and segment the objects depicted in the digital image 106, where the objects depicted in the digital image are each identified by a bounding border that delineates an object region boundary of a respective object. For example, as shown at 120, each of the individual objects 122 that are the image content depicted in the digital image 106 are delineated by a bounding border 124, as determined by the object segmentation 116.

In implementations, the object segmentation 116 determines the bounding border 124 for each of the objects 122 depicted in the digital image 106 as a closed edge path around a respective object, such as a bounding box. Generally, a bounding box is the minimum or smallest bounding around an object, having an area of an object region in which the object is contained. The segmented output for each object is a continuous bounding border (e.g., bounding box) that encloses an object 122, as determined by traversing the closed loop of each detected edge, and finding the maximum and minimum x and y coordinate values. The guidelines segmentation system 104 can implement the object segmentation 116 with the known "YOLOv4" object detection neural network model, which performs the object segmentation to segment the digital image 106 into different regions. The features of the object detection model are described and detailed in the document "YOLOv4: Optimal Speed and Accuracy of Object Detection" by Bochkovskiy et al. (arXiv:2004.10934v1 [sc.CV] 23 Apr. 2020).

Generally, as shown at 120, the raster-based image can be divided into regions represented by the equation: $I = \Sigma_{i=1}^{i=n} R_i + B$, where n is the total number of objects in the image; $R_i$ is the segment region 126 of object i; B is the remaining region of the image (for background 128); and I is the entire image. Notably, the object segmentation 116 provides better results than would be attained by first directly applying edge detection to the digital image because each segment forms a closed continuous path. This also provides the flexibility to generate the image content snapping guidelines particular to each respective object.

The guidelines segmentation system 104 also implements edge detection 130 (e.g., an edge detection module or component), which receives the segmented objects 132 corresponding to each of the objects 122 identified and segmented in the digital image 106. The edge detection 130 is implemented determine the object external edges around an object, as well as determine object feature edges of the object, and identify object corners of the object. For example, as shown at 134, the edge detection 130 is utilized to determine the contours, edges, and features of an object in all directions and determine the object external edges 136 around the object, as well as the object feature edges 138 of the object. The object feature edges 138 correspond to contours or feature edges within the depiction of an object, internal to the object external edges and within the bounding border that delineates the object region boundary of the object.

In implementations, an object segmentation algorithm is implemented to receive a raster/bitmap as an input image, and generates another raster/bitmap as an output image. The output image is of the same dimension as the input image, and is generally representative of a mask in which all of the image content except the detected objects are black pixels, while the detected objects are represented as white patches. The bounding borders (e.g., the bounding boxes) are then calculated and determined around the white patches (e.g., the objects) in the mask. The corresponding bounding borders determined in the input image delineate the object region boundaries of the respective objects depicted in the input image. The object segmentation 116 generates the set of segmented objects 132 in the raster/bitmap format of the input image. The guidelines segmentation system 104 can then run the edge detection 130 (e.g., an edge detection module or component) on each of the bounding borders (e.g., the "cropped" bounding boxes of the identified objects) to detect the object edges 144 for each of the objects depicted in the digital image. As noted below, the edge detection 130 can be implemented with the known "Canny Edge Detector" model, which traverses a segmented object 132 by processing each scanline on the output raster of the Canny Edge Detector to store the start point and end point of each segment, which is used to process each pixel within a curve segment from the start point to the end point.

The guidelines segmentation system 104 can implement the edge detection 130 with the known "Canny Edge Detector" model, which performs the edge detection as described and detailed in the document "A Computational Approach to Edge Detection" by Canny (IEEE Transactions on Pattern Analysis and Machine Intelligence, 8(6):679-698, 1986). Notably, as implemented in this example, the edge detection 130 is utilized to produce single, pixel-width edges, which are traversed to find a closed path that can be represented as a closed Bezier path, and the output of the edge detection is used as a bitmap mask of edges. Alternatively or in addition, other edge detection models may be implemented, such as the "Kirsch Compass Mask" model which is usable to determine the object feature and external edges of an object in all possible directions.

In implementations, the edge detection 130 is utilized to traverse the edges of a segmented object 132 and detect the nearly-straight lines at any angle (e.g., not only the horizontal and vertical edge lines). The identified object feature and external edges of an object are converted to precisely fitting Bezier curves that define the bounding border of a corresponding object. For example, the edge detection 130 can traverse the edges of a segmented object 132 to determine the object external edges 136 as approximate straight-line external edges around the object within the bounding border 124 of the corresponding object 122. The edge detection 130 can also determine the object feature edges 138 as approximate straight-line feature edges of the object. The approximate, or nearly straight-lines can be determined utilizing any type of available line detection algorithm implemented with the edge detection 130, such as the known "Hough Transform" feature extraction model used for digital image processing (detailed in U.S. Pat. No. 3,069,654).

Additionally the edge detection 130 (e.g., the edge detection module or component) of the guidelines segmentation system 104 can be utilized to identify background features depicted in the digital image 106 that have not been detected and segmented by the previous object segmentation 116. For some digital images, such as in raster-based graphics, the object segmentation 116 may not detect all of the objects depicted in an image, such as in an image with a large sky or other expansive background. Accordingly, the edge detection 130 can be used to identify other background features in the digital image 106, and detect the single, pixel-width edges around an identified background feature.

The guidelines segmentation system 104 also implements snapping guidelines 140 (e.g., a snapping guidelines module or component), which is utilized to determine the image content snapping guidelines 142 for each of the objects 122 depicted in the digital image 106. The snapping guidelines 140 receives the detected object edges 144 from the edge detection 130 for each of the objects 122 depicted in the digital image. In implementations, the image content snapping guidelines 142 for an object are determined based on the bounding border of the object region boundary, the object external edges, the object feature edges, and projected snapping guidelines that extend from the object corners of an object. For example, as shown at 146, the snapping guidelines 148 correlate to detected object edges 144 of the objects depicted in the digital image 106. A graphics image designer can use the image content snapping guidelines 142 to facilitate aligning and placing text 150 over the image content of the digital image, which is displayed at 152 on the user interface 110 of the image editing application 108.

The bounding border snapping guidelines are determined by the snapping guidelines 140 as horizontal and vertical snapping guidelines corresponding to edges of the bounding border 124 of the object region boundary. For each closed Bézier curve of a segmented object (identified as the detected object edges 144), the bounding border 124 is computed as a bounding box having a structure for each object represented with a first identifier=$(X_{min}, Y_{min}, X_{max}, Y_{max})$ (e.g., coordinate (x, y) points in a Cartesian system), and a second identifier=Area $A_n$ of the bounding border. The center of the bounding border is computed as:

$$x\text{Center}=x\text{Min}+(x\text{Max}-x\text{Min})/2 \text{ and } y\text{Center}=y\text{Min}+(y\text{Max}-y\text{Min})/2.$$

The external edge snapping guidelines are determined as corresponding to the object external edges around an object, and the feature edge snapping guidelines are determined as corresponding to the object feature edges of the object. Additionally, the image content snapping guidelines 142 can include background feature snapping guidelines determined from background features identified by the edge detection 130. Generally, the external edge snapping guidelines and the feature edge snapping guidelines for an object are all image content snapping guidelines 142 that follow the contours of the object external edges and the object feature edges of the objects 122 depicted in the digital image.

Notably, these various image content snapping guidelines 142 provide useful guidance and alignment for a user who wants to place text or an object over the image content of the digital image 106, such as when working with digital images that are formatted as raster-based graphics in the image editing application 108. The image content snapping guidelines 142 facilitate parallel alignment to almost any of the straight contours of the object external edges and the object feature edges of an object 122 depicted in the digital image. Generally, the line structure of each of the image content snapping guidelines 142 is represented with a first identifier=$(X_1, Y_1, X_2, Y_2)$ and with a second identifier=Length $L_n$ of the line.

As noted above, the nearly straight-lines of the detected object edges 144 can be determined utilizing any type of available line detection algorithm, such as the known "Hough Transform" feature extraction model used for image analysis and digital image processing. An approximate, or nearly straight-line is determined based on delta changes in gradient when traversing from one pixel to another along a detected object edge. Any part of a detected object edge 144 can be identified as an approximate straight-line given three properties: (1) the portion of the object edge is monotonically non-decreasing or monotonically non-increasing; (2) the change in gradient at every step is less than a threshold alpha; and (3) the change in gradient at every pixel and the first pixel is less than a threshold beta.

In this implementation, the first property provides that the detected object edges 144 are split in monotonic segments, where a line is always monotonic and therefore a candidate snapping guideline will be monotonic. The second property is an initial check that the gradient is not changing by much at every step, and given that the gradient of a line is constant, a candidate snapping guideline will follow this property with minimal tolerance (alpha). The third property facilitates to avoid the "greedy" algorithm trap, such as for a long edge and incrementally small gradients that may lead to a curve. This third property enforces global constraints by calculating the gradient from the first point on the object edge.

In implementations, the snapping guidelines 140 (e.g., the snapping guidelines module or component) can include a corner detector to identify the sharp turns or corners on the detected object edges 144, such as the known "Harris Corner Detector" model that is commonly used for image analysis and digital image processing to extract object corners as described and detailed in the document "A Combined Corner and Edge Detector" by Harris et al. (*Alvey Vision Conference* 15 (1988)).

In this example 100, the computing device 102 includes a guidelines database 154 that maintains the image content snapping guidelines 142 corresponding to the object external edges and object feature edges of the objects 122 depicted in the digital image 106. The guidelines database 154 maintains the image content snapping guidelines 142 for the respective objects as determined by the snapping guidelines 140. This guidelines database 154 is a dictionary containing all of the bounding border (e.g., bounding box) coordinates, as well as the bounding border area designations, of the respective bounding borders 124 determined by the object segmentation 116. The guidelines database 154 (e.g., the dictionary) also contains all of the approximate straight-lines of the objects that have been detected by the edge detection 130. In implementations, some of the bounding borders 124 and the image content snapping guidelines 142 can be discarded, such as based on the current image size of the digital image and line length threshold values, to avoid unwanted cluttering of the image content snapping guidelines 142 in the guidelines database 154.

Notably, if the digital image 106 was initially scaled-down and reduced in size as the re-sized digital image 118, then the bounding borders 124 and the image content snapping guidelines 142 can be scaled back up to the original image size with respect to the coordinate system of the input image. Generally, the Bézier curves are all scaled back up to the original image size of the digital image 106 so that the Bézier curve points reflect the original image size based on the original image coordinate system. Given this technique, the image content snapping guidelines 142 can be generated for the objects 122 depicted in larger-sized images in less time as compared to working with the digital image at its original larger size.

Additionally, the bounding borders 124 and the image content snapping guidelines 142 can be utilized at any zoom level of the objects 122 in the digital image. For example, a designer may increase or decrease the zoom level of the digital image 106 as displayed in the user interface 110 of the image editing application 108, such as for detail accuracy and convenience when working on and designing the image, and the bounding borders 124 and the image content snapping guidelines 142 are adaptive to the varying zoom levels. When the zoom level of the digital image 106 is increased or decreased, as displayed in the user interface 110, the threshold value for identifying objects, removing clutter, and removing small edges can also be updated and changed.

Accordingly, depending on the zoom level of the image, a candidate number of the image content snapping guidelines 142 is modified based on the zoom level, where the number of image content snapping guidelines may increase or decrease. For example, the image content snapping guidelines 142 that are significant at a current zoom level may become insignificant (e.g., too small or too big to display) at an adjusted zoom level, while previously insignificant image content snapping guidelines 142 may become significant at the newly adjusted zoom level. In implementations, the user interface 110 may include a user-selectable control or dialogue by which the user can set or control a minimum threshold value for adding or removing the Bézier curves according to a particular threshold at a particular zoom level of the digital image.

Figure 2:
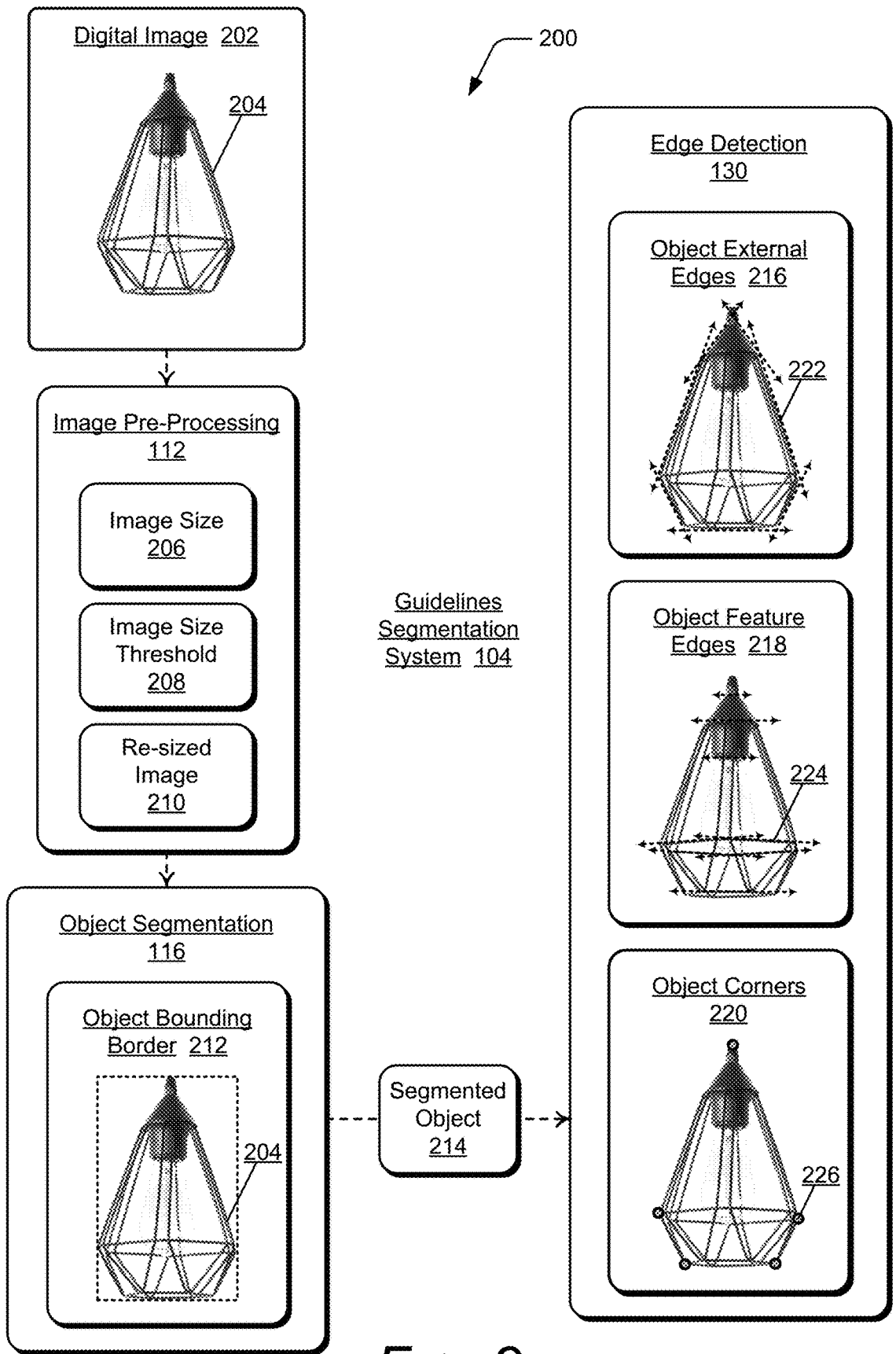
FIG. 2 further illustrates an example of features of a guidelines segmentation system as implemented by the computing device for image content snapping guidelines.

FIG. 2 further illustrates an example 200 of features of the guidelines segmentation system 104 as implemented by the computing device 102 for image content snapping guidelines. As shown and described with reference to FIG. 1, the guidelines segmentation system 104 includes the features, components, modules, software, firmware, and/or hardware that implement the features of the image pre-processing 112, the object segmentation 116, and the edge detection 130 to determine and generate the image content snapping guidelines 142. In this example 200, the image pre-processing 112 of the guidelines segmentation system 104 receives a digital image 202 as an input image, and the digital image includes an object 204 depicted as the image content in the digital image.

The image pre-processing 112 of the guidelines segmentation system 104 determines an image size 206 of the digital image 202, and if the image size 206 exceeds an image size threshold 208, the image pre-processing generates a re-sized image 210 of the digital image 202. In this example 200, the digital image 202 is formatted as a raster-based graphic of size m-pixels by n-pixels ("m×n"), and as described above with reference to FIG. 1, the size of the digital image 202 is determined by the image pre-processing 112 based on the number of pixels that makeup the image.

The object segmentation 116 of the guidelines segmentation system 104 receives the digital image 202, or receives the re-sized image 210 of the digital image, and determines an object bounding border 212 that encompasses the object 204 (e.g., the image content) depicted in the digital image. If a digital image includes more than one object, then the object segmentation 116 determines an object bounding border 212 for each individual object that is identified as being depicted in the digital image.

The edge detection 130 of the guidelines segmentation system 104 receives the segmented object 214 corresponding to the object 204, as determined by the object segmentation 116 to differentiate the one or more objects depicted in the digital image 202 with respective object bounding borders. The edge detection 130 of the guidelines segmentation system 104 traverses the contours, edges, and features of the segmented object 214 and determines the object external edges 216, the object feature edges 218, and the object corners 220 for each separate object depicted in the digital image 202, as determined by the object segmentation.

As described above with reference to FIG. 1, the edge detection 130 implements the "Canny Edge Detector" model to determine the object external edges 216, which are then candidates for image content snapping guidelines along the object external edges 222 of the object 204, as determined from the segmented object 214. The "Canny Edge Detector" model of the edge detection 130 also determines the object feature edges 218, which are also candidates for the image content snapping guidelines along the contours of the object feature edges 224, within the object 204, as determined from the segmented object 214. The edge detection 130 also implements the "Harris Corner Detector" model to determine the object corners 220, which are also candidates for the image content snapping guidelines at the corners 226 of the object 204, as determined from the segmented object 214.

Figure 3:
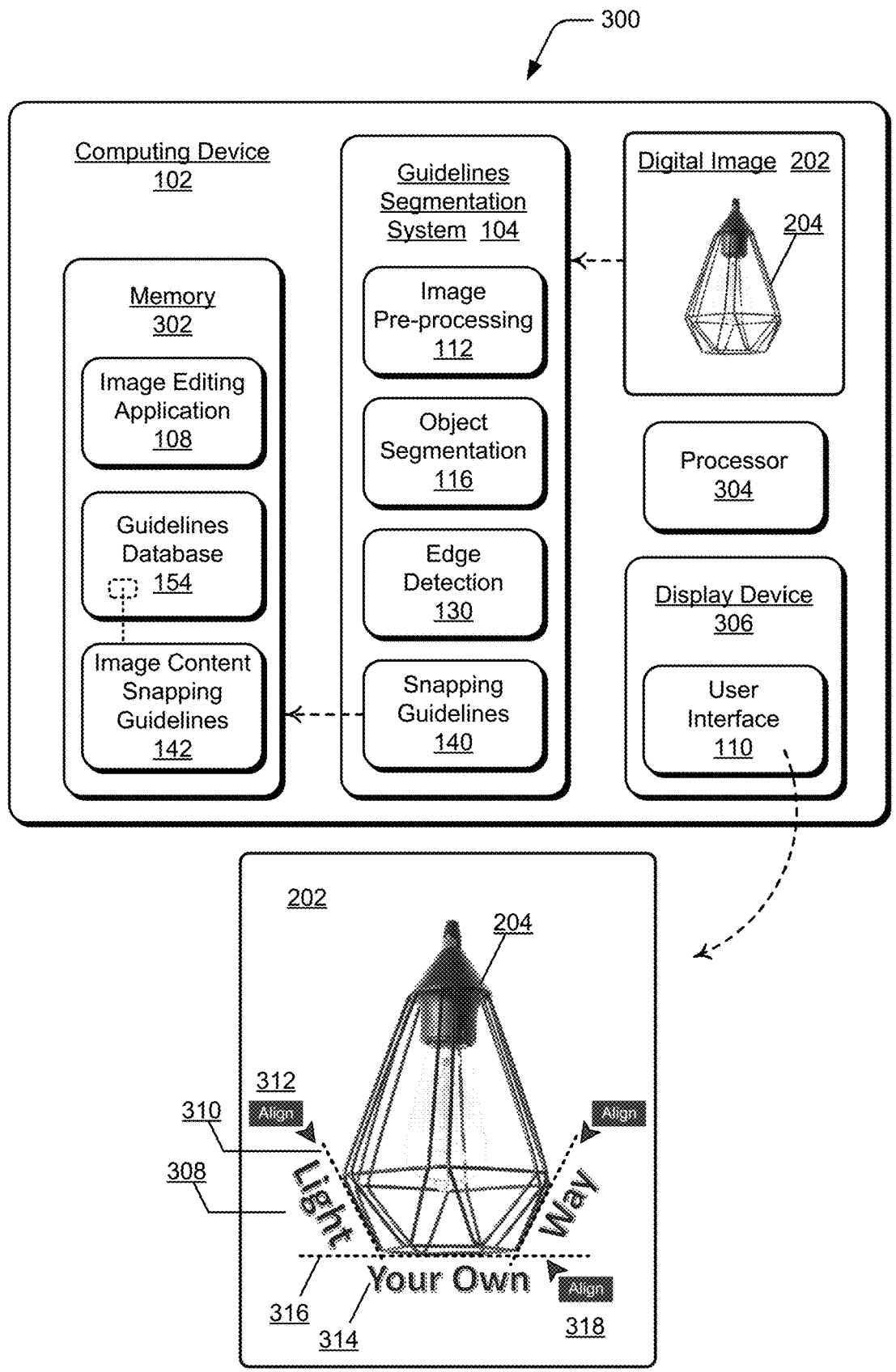
FIG. 3 further illustrates an example of features of the computing device that implements aspects of the techniques for image content snapping guidelines.

FIG. 3 further illustrates an example 300 of features of the computing device 102 that implements aspects of the techniques for image content snapping guidelines, as described herein. As shown and described with reference to FIG. 1, the computing device 102 can be implemented as any type of computing device that includes any number and combination of different components as further described with reference to the example device shown in FIG. 12. Generally, the computing device 102 includes a memory 302 and a processor 304, as well as a display device 306 to display the digital image 202 in the user interface 110 of the image editing application 108. The user interface 110 may include a user-selectable toggle by which a user can activate the image content snapping guidelines 142 for the one or more objects depicted in a digital image, such as the object 204 shown depicted in the digital image 202. Further, as shown and described with reference to FIGS. 1 and 2, the guidelines segmentation system 104 includes the features, components, modules, software, firmware, and/or hardware that implement the features of the image pre-processing 112, the object segmentation 116, the edge detection 130, and the snapping guidelines 140 to determine and generate the image content snapping guidelines 142.

As noted above, the display device 306 displays the digital image 202 in the user interface 110 of the image editing application 108. In implementations, the image editing application 108 receives positioning inputs in the user interface 110 to position a text object 308 (e.g., the text "Light") on the digital image 202 near an object external edge of the object 204 depicted in the digital image. For example, a designer may move the text object 308 with a mouse, a stylus, by touch control, and/or by any other input technique to position the text object 308 in approximate alignment and position to add the text over the digital image 202 near the object 204. The guidelines segmentation system 104 and/or the image editing application 108 detects the position of the text object 308 near the object external edge of the object 204 depicted in the digital image 202 (e.g., within a designated distance threshold), and can initiate to display the image content snapping guideline 310 to facilitate alignment of the text object 308 with the displayed object 204 depicted in the digital image. In implementations, the system detects alignment of the y-coordinates to match the y-coordinate of the text object 308 with the y-coordinate of the image content snapping guideline 310.

Additionally, the text object 308 may also be delineated by a text bounding box (not shown) and the image content snapping guideline 310 is displayed if an edge of the text bounding box aligns with the image content snapping guideline 310 of the object 204. If the text object 308 and the image content snapping guideline 310 are approximately aligned, the guidelines segmentation system 104 snaps the text object 308 into alignment and position along the object external edge of the object 204 at the designated position of the text object. Alternatively, an edge of the text bounding box may only be proximate the image content snapping guideline 310, and the guidelines segmentation system 104 and/or the image editing application 108 initiates to display the image content snapping guideline 310 along with an alignment control 312 that is user-selectable in the user interface 110 to reposition the text object 308 in rotation and/or parallel alignment with the object 204 depicted in the digital image. Notably, the image content snapping guidelines may not be displayed on the user interface over a digital image, but rather are utilized to snap and align a text object without displaying the image content snapping guideline.

Similar to the text positioning example above, the image editing application 108 can also receive positioning inputs in the user interface 110 to position a text object 314 (e.g., the text "Your Own") on the digital image 202 near an object external edge of the object 204 depicted in the digital image. The guidelines segmentation system 104 and/or the image editing application 108 detects the position of the text object 314 near the object external edge of the object 204 depicted in the digital image 202 (e.g., within a designated distance threshold), and can facilitate alignment of the text object 314 with the displayed object 204 depicted in the digital image. If the text object 314 and the image content snapping guideline 316 are detected as being approximately aligned, the guidelines segmentation system 104 snaps the text object 314 into alignment and position along the object external edge of the object 204 at the designated position of the text object. Alternatively or in addition, an alignment control 318 is displayed, which is user-selectable in the user interface 110 to reposition the text object 314 in parallel alignment with the object 204 depicted in the digital image.

Figure 4:
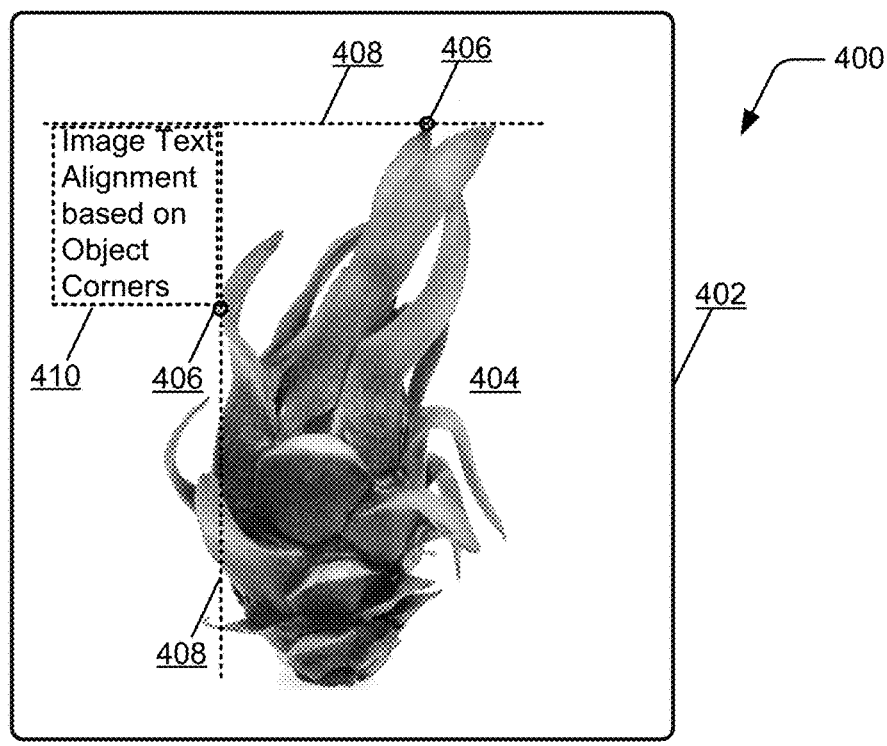
FIGS. 4-7 further illustrate examples of techniques for image content snapping guidelines as implemented by the example computing device.

FIG. 4 further illustrates an example 400 of techniques for image content snapping guidelines as implemented by the example computing device 102, as described herein. In this example 400, a digital image 402 depicts a type of flower or plant (e.g., image content), and the flower or plant has been determined as an object 404 of the image by the object segmentation 116 (e.g., a module or component) of the guidelines segmentation system 104. Additionally, the edge detection 130 (e.g., a module or component) of the guidelines segmentation system 104 determines the object corners 406 from the segmented object. The object corners 406 are then utilized as a basis to generate the image content snapping guidelines 408 in this image 404 by the snapping guidelines 140 (e.g., a module or component) of the guidelines segmentation system 104. A text object 410 is then positioned on the digital image 402 in alignment with the horizontal and vertical tangent lines through the object corners 406 that are the image content snapping guidelines 408.

Figure 5:
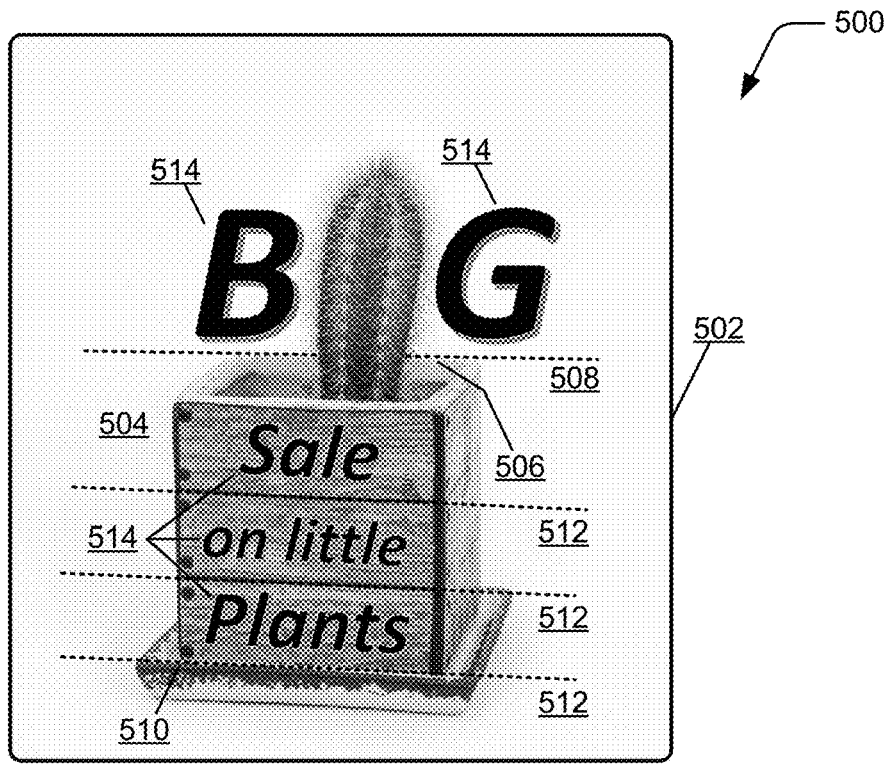

FIG. 5 further illustrates an example 500 of techniques for image content snapping guidelines as implemented by the example computing device 102, as described herein. In this example 500, a digital image 502 depicts a planter box with a small cactus plant (e.g., the image content), and the planter box has been determined as an object 504 of the image by the object segmentation 116 (e.g., a module or component) of the guidelines segmentation system 104. Additionally, the edge detection 130 (e.g., a module or component) of the guidelines segmentation system 104 identifies the object external edge 506 of the object 504, from which the snapping guidelines 140 (e.g., a module or component) of the guidelines segmentation system 104 generates the image content snapping guideline 508 for the object. The edge detection 130 of the guidelines segmentation system 104 also identifies the object feature edges, such as the object feature edge 510 of the object 504. The snapping guidelines 140 then generates the image content snapping guidelines 512 for the object based on the contours of the object feature edges of the object.

Various text objects 514 can be detected by the guidelines segmentation system 104 and/or by the image editing application 108 when a user positions the text objects 514 near the object external edge 506 and the object feature edges 510 of the displayed object 504. The guidelines segmentation system 104 and/or the image editing application 108 detects the positioning of the text objects 514 near the object feature edges and/or the object external edges of the object 504 depicted in the digital image 502 (e.g., within a designated distance threshold), and facilitate alignments of the text objects 514 with the object feature edges and/or the object external edges of the displayed object 504 depicted in the digital image.

Figure 6:
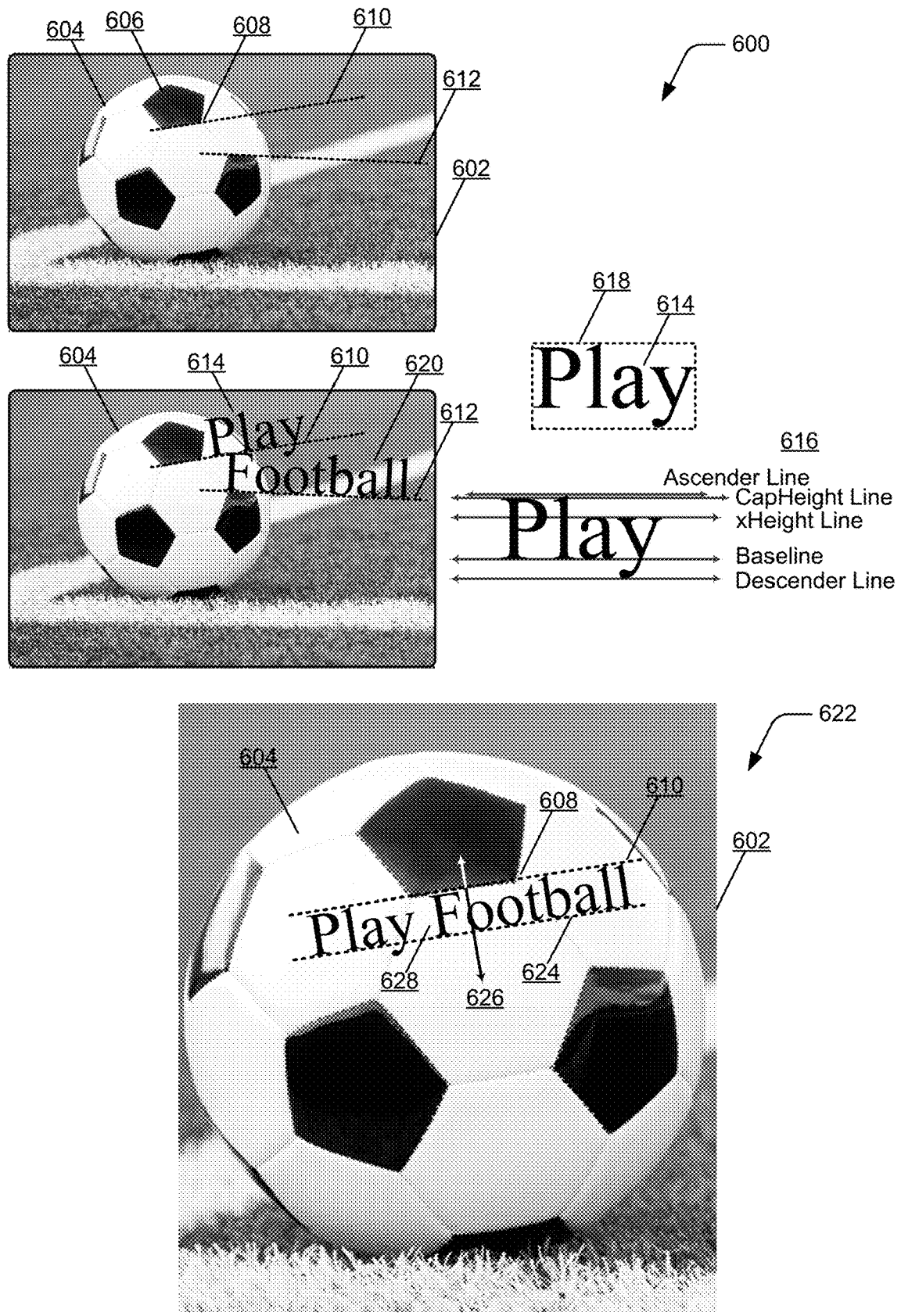

FIG. 6 further illustrates an example 600 of techniques for image content snapping guidelines as implemented by the example computing device 102, as described herein. In this example 600, a digital image 602 depicts a soccer ball (e.g., the image content), and the soccer ball has been determined as an object 604 of the image by the object segmentation 116 (e.g., a module or component) of the guidelines segmentation system 104. In this example, the object 604 includes internal object features 606, such as the black panels stitched in the cover of the soccer ball. The edge detection 130 (e.g., a module or component) of the guidelines segmentation system 104 identifies the object feature edges, such as the internal feature edge 608 of the internal object feature 606.

The snapping guidelines 140 (e.g., a module or component) of the guidelines segmentation system 104 then generates the image content snapping guidelines 610, 612 for the object 604 based on the internal features, contours, and/or edges of the internal object features 606, specifically the edges of the black panels stitched in the cover of the soccer ball.

Notably, the text object 614 that a user may want to place in alignment on, over, or near the internal object features 606 of the object 604 in the digital image 602 also has several feature guidelines 616 that can each be used to align the text placement with the object feature edges of the object 604, such as the internal feature edge 608 of the displayed object. For example, candidate points for snapping guidelines of the text object 614 include the text bounding box 618, a text ascender line, a text CapHeight line, a text xHeight line, a text center line, a text baseline, and a text descender line. For the horizontal snapping guidelines, they-coordinate of each feature guideline of the text object 614 is matched with the y-coordinate of the object internal bounding boxes and center. If there is a match or alignment, an image content snapping guideline 610, 612 is displayed on the user interface 110. In this example 600, the baseline feature guideline 616 of the text object 614 (e.g., the text "Play") is aligned with the object feature edge 608 based on alignment with the image content snapping guideline 610. Similarly, a baseline feature guideline of a text object 620 (e.g., the text "Football") is aligned with another object feature edge based on alignment with the image content snapping guideline 612.

In a further example shown at 622, the image content snapping guideline 610 and a parallel image content snapping guideline 624 are used to generate a perpendicular snapping guideline 626, which can be used to align a text object 628 (e.g., the text "Play Football") that is positioned over the object 604 displayed in the digital image 602. The perpendicular snapping guideline 626 can be utilized to facilitate alignment of the text object 628 when the object feature edge 608 and the bounding box edge of the text object 628 are perpendicular to each other.

Figure 7:
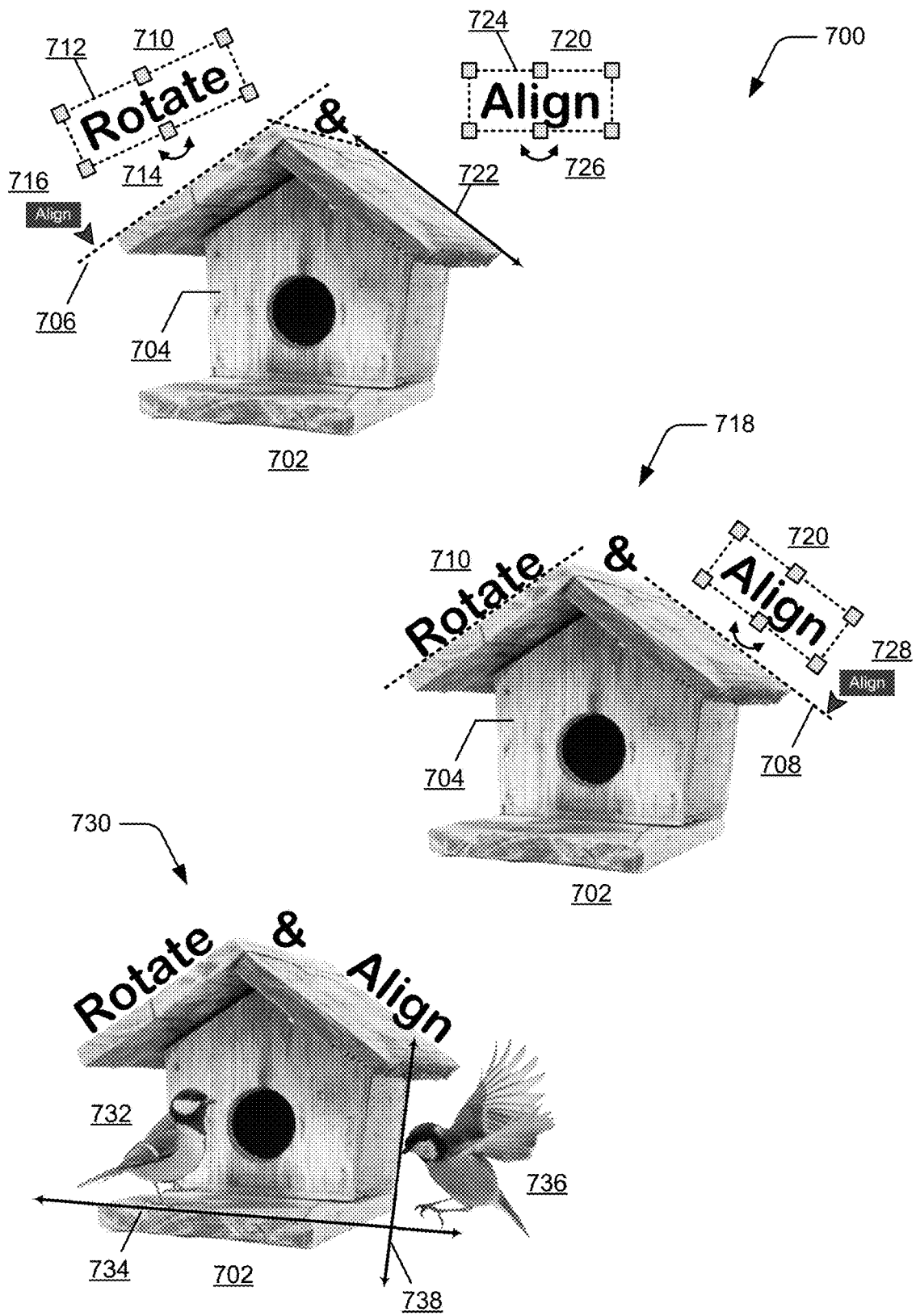

FIG. 7 illustrates an example 700 of techniques for image content snapping guidelines as implemented by the example computing device 102, as described herein. In this example 700, a digital image 702 depicts a bird house (e.g., the image content) as an object 704 of the image determined by the object segmentation 116 (e.g., a module or component) of the guidelines segmentation system 104. Additionally, the edge detection 130 (e.g., a module or component) of the guidelines segmentation system 104 has identified object external edges of the object 704, from which the snapping guidelines 140 (e.g., a module or component) of the guidelines segmentation system 104 generates the image content snapping guidelines 706, 708 for the exterior of the object.

As described in above examples, the display device 306 of the computing device 102 displays the digital image 702 in the user interface 110 of the image editing application 108. In implementations, the image editing application 108 receives positioning inputs in the user interface 110 to position a text object 710 (e.g., the text "Rotate") on the digital image 702 near an object external edge of the object 704 depicted in the digital image. In this example, the text object 710 includes a text bounding box 712 with a rotation control 714, which a designer can manipulate to rotate the text box and approximately align the text object 710 with an object external edge, such as along the roof line of the bird house depicted in the digital image 702.

The designer may also move the text object 710 with a mouse, a stylus, by touch control, and/or by any other input technique to position the text object 710 in approximate alignment and position to add the text over the digital image 702 near the object external edge of the object 704. The guidelines segmentation system 104 and/or the image editing application 108 detects the position of the text object 710 near the object external edge of the object 704 (e.g., within a designated distance threshold), and can initiate to display the image content snapping guideline 706 to facilitate alignment of the text object 710 with the object external edge of the displayed object 704 depicted in the digital image. In this example, a user-selectable alignment control 716 is also displayed in the user interface 110, and a user can select the alignment control 716 to initiate having the text object 710 rotated for parallel alignment with the image content snapping guideline 706. As shown at 718, the text object 710 is rotated and parallel aligned with the object external edge along the roof line of the bird house.

As noted above, the image content snapping guidelines 706, 708 may not be displayed on the user interface 110 over a digital image, but rather are utilized to snap and align a text object without displaying the image content snapping guidelines. In this example 700, a text object 720 (e.g., the text "Align") is similarly positioned proximate an object external edge 722 of the object 704 depicted in the digital image 702. The text object 720 includes a text box 724 with a rotation control 726, which the designer can manipulate to rotate the text box and approximately align the text object 720 with the object external edge 722, such as along the roof line of the bird house depicted in the digital image 702. As shown at 718, the text object 720 is rotated and parallel aligned with the image content snapping guideline 708 along the object external edge 722 of the roof line of the bird house. A user-selectable alignment control 728 is also displayed in the user interface 110, and a user can select the alignment control 728 to initiate having the text object 720 rotated for parallel alignment with the image content snapping guideline 708. As shown in an example at 730, the text object 720 is rotated and parallel aligned with the object external edge along the roof line of the bird house.

The example shown at 730 also illustrates that additional objects (e.g., other than text objects) can be positioned and aligned along the contours of the object external edges and the object feature edges of objects depicted in digital images. For example, a shape object 732 (e.g., an image of a bird) is positioned over the digital image 702, aligned with an object feature edge 734 of the object 704 depicted in the digital image 702. Additionally, a shape object 736 (e.g., an image of a flying bird) is positioned over the digital image 702, aligned with both the object feature edge 734 of the object 704 and with an object external edge 738 of the object 704 depicted in the digital image 702.

Figure 8:
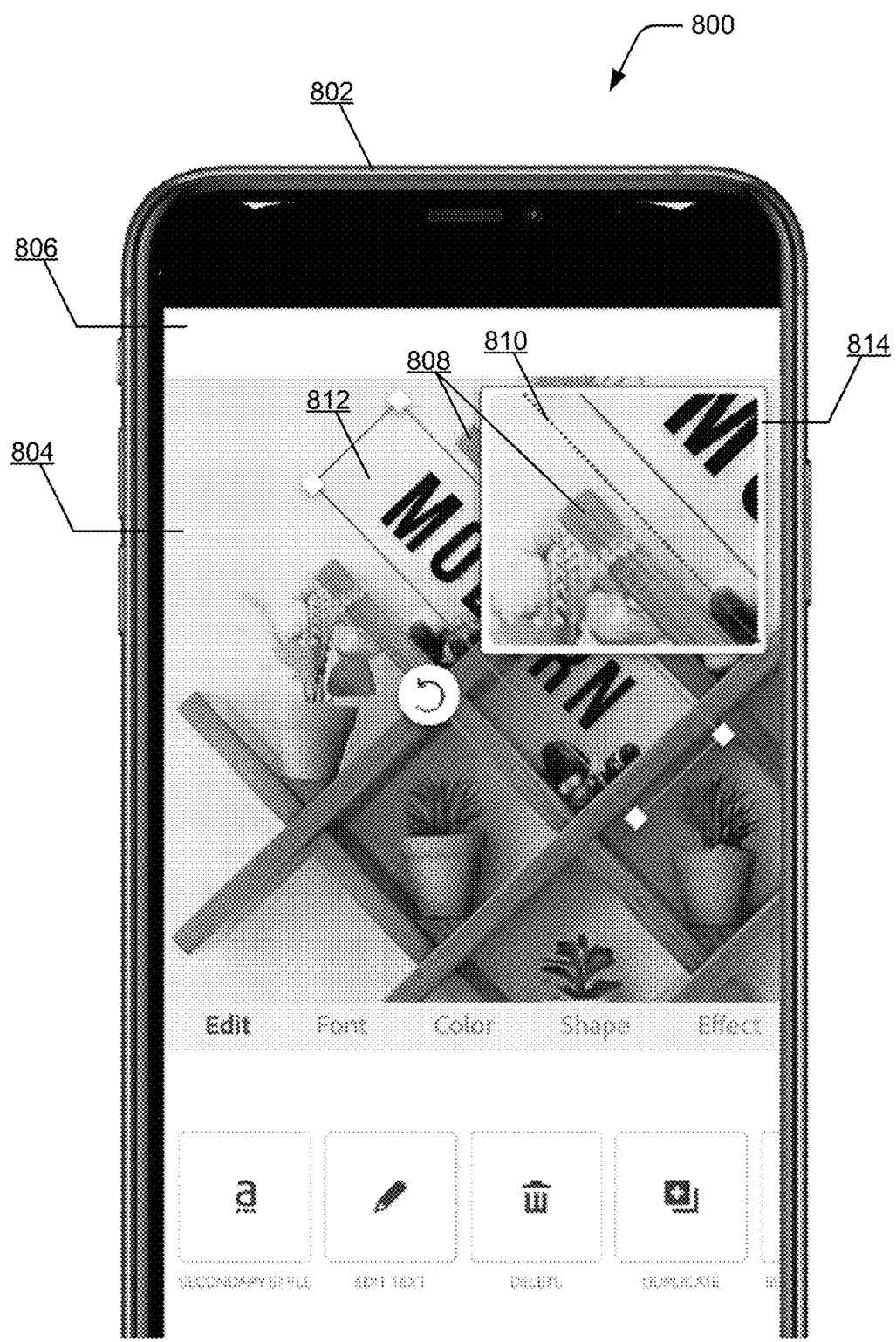
FIG. 8 illustrates an example of techniques for image content snapping guidelines on a mobile device as implemented by the example computing device.

FIG. 8 illustrates an example 800 of techniques for image content snapping guidelines on a mobile device 802, such as implemented by the example computing device 102 as described herein. In this example 800, a digital image 804 is displayed on a display device 806 of the mobile device 802, and the digital image 804 depicts a shelf with planters (e.g., the image content). The shelves in the image have been determined as objects of the image by the object segmentation 116 (e.g., a module or component) of the guidelines segmentation system 104. Additionally, the edge detection 130 (e.g., a module or component) of the guidelines segmentation system 104 identifies the object feature edges 808 along the shelves, from which the snapping guidelines 140 (e.g., a module or component) of the guidelines segmentation system 104 generates the image content snapping guideline 810 for the object. In this example, a text object 812 is displayed in the user interface over the digital image 804, and the text object is rotated to parallel align with the image content snapping guideline 810 that corresponds to the object feature edges 808 along the shelves.

Notably, a mobile platform has very limited design display space, such as on the display device 806 of the mobile device 802, and it can be difficult for a designer (e.g., a user of the device) to align any text or shape objects working on the smaller display screen. In this example, the designer may want to position and align the text object 812 with the object feature edges 808 of the shelves in the digital image 804. However, accuracy of input is limited on the display space of the mobile device for the designer to work at the object level. Accordingly, implementations of the techniques described herein provide that as the designer moves the text object 812 into position and alignment with the object feature edges 808 of the shelves in the digital image 804, the guidelines segmentation system 104 and/or the image editing application 108 detects the positioning of the text object 812 and automatically zooms into the area of the image where the user is trying to align the text object 812 in the image in a snippet user interface 814. The snippet user interface 814 facilitates assisting the designer with more precise alignment of the text object 812 on the digital image 804, and the text object 812 can snap into alignment on the digital image.

Example methods 900, 1000, and 1100 are described with reference to respective FIGS. 9, 10, and 11 in accordance with one or more aspects of image content snapping guidelines. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 9:
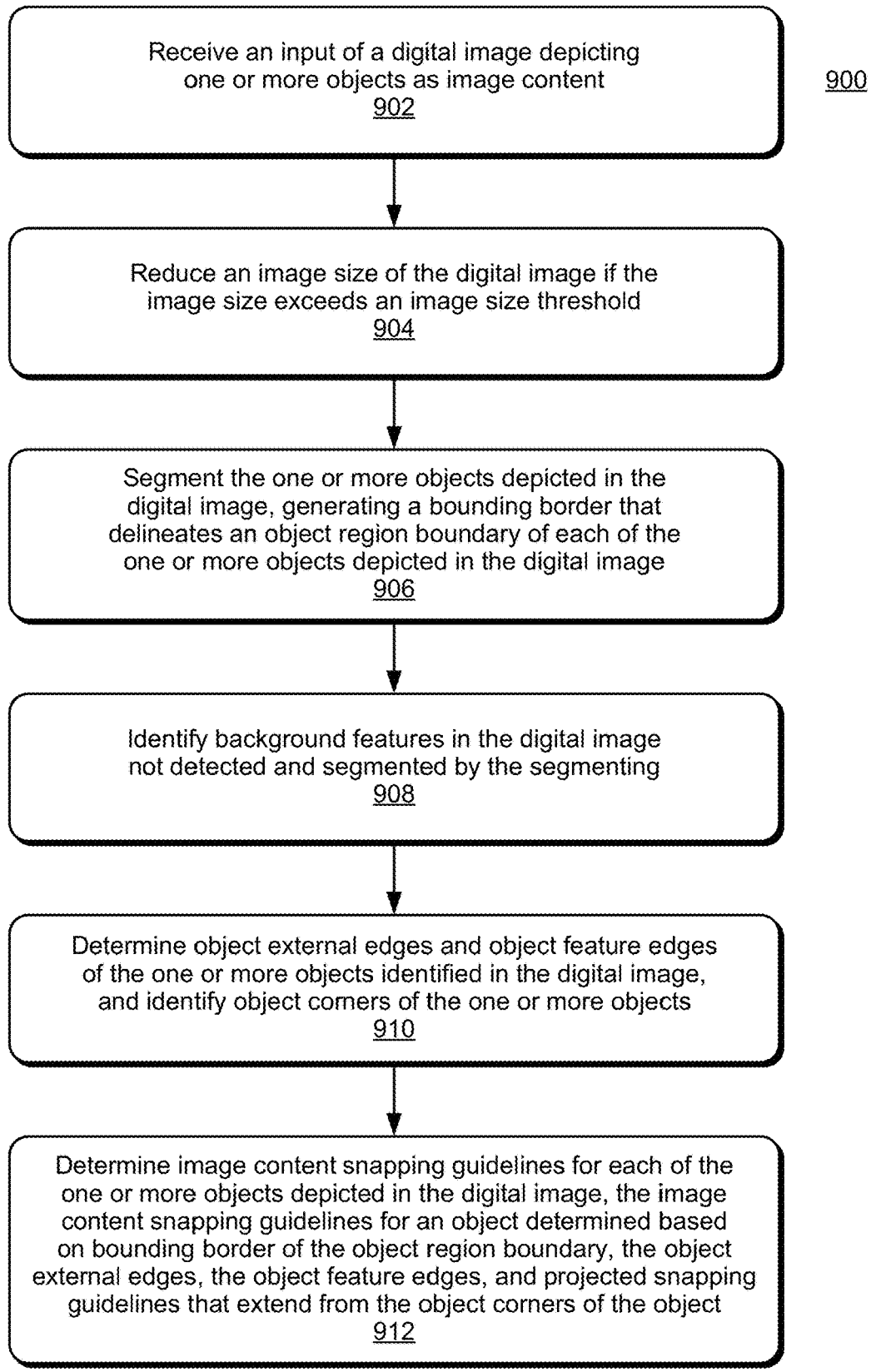
FIGS. 9-11 illustrate example methods of image content snapping guidelines in accordance with one or more implementations.

FIG. 9 illustrates example method(s) 900 for image content snapping guidelines, and is generally described with reference to the guidelines segmentation system implemented by a computing device as shown and described with reference to FIGS. 1-8. The order in which the method is described is not intended to be construed as a limitation, and any number or combination of the method operations can be combined in any order to implement a method, or an alternate method.

At 902, an input is received as a digital image depicting one or more objects as image content. For example, the guidelines segmentation system 104 receives the digital image 106 as an input image, such as a digital image formatted as a raster-based graphic image.

At 904, an image size of the digital image is reduced if the image size exceeds an image size threshold. For example, the image pre-processing 112 (e.g., an image pre-processing module or component) determines the current image size 206 of the digital image 106 and, if the current image size 206 exceeds an image size threshold 208, reduces the image size of the digital image 106 down to at least the image size threshold. In this example, the digital image 106 is formatted as a raster-based graphic of size m-pixels by n-pixels ("m× n"), and the size of the digital image is determined by the image pre-processing 112 based on the number of pixels that makeup the image.

At 906, the one or more objects depicted in the digital image are segmented, generating a bounding border that delineates an object region boundary of each of the one or more objects depicted in the digital image. For example, the object segmentation 116 (e.g., an object segmentation module or component) identifies and segments the objects depicted in the digital image 106, and a bounding border 212 is generated for each of the objects to delineate the object region boundary of each respective object. In an implementation, each of the individual objects 122 that are the image content depicted in the digital image 106 are delineated by a bounding border 124, as determined by the object segmentation 116.

At 908, background features in the digital image not detected and segmented by the segmenting are identified. For example, the edge detection 130 (e.g., an edge detection module or component) is utilized to identify background features that may appear in the digital image 106, yet are not detected and segmented by the object segmentation 116. For some digital images, such as in raster-based graphics, the object segmentation 116 may not detect all of the objects depicted in an image, such as in an image with an expansive background. Accordingly, the edge detection 130 can be used to identify other background features in the digital image 106, and detect the single, pixel-width edges around an identified background feature.

At 910, object external edges and object feature edges of the one or more objects identified in the digital image are determined, and object corners of the one or more objects are identified. For example, the edge detection 130 (e.g., an edge detection module or component) determines the object external edges 216 and the object feature edges 218 of the one or more objects identified in the digital image, and identifies object corners 220 of the one or more objects. In implementations, the edge detection 130 is utilized to determine the contours, edges, and features of an object in all directions, and determine the object external edges 216 around the object, as well as the object feature edges 218 of the object. Further, the edge detection 130 can traverse the segmented object 132 to determine the object external edges 216 as approximate straight-line external edges around a corresponding object within the bounding border 212 of the object, and determine the object feature edges 218 as approximate straight-line feature edges of the object.

At 912, image content snapping guidelines are determined for each of the one or more objects depicted in the digital image, the image content snapping guidelines for an object determined based on the bounding border of the object region boundary, the object external edges, the object feature edges, and projected snapping guidelines that extend from the object corners of the object. For example, the snapping guidelines 140 (e.g., a snapping guidelines module or component) determines the image content snapping guidelines 142 for each of the objects 122 depicted in the digital image 106, such as based on the bounding border of the object region boundary, the object external edges, the object feature edges, and projected snapping guidelines that extend from the object corners of the object. The snapping guidelines 140 also determines background feature snapping guidelines based on the background features identified by the edge detection 130 (at 908). In implementations, the snapping guidelines 140 determines the bounding border snapping guidelines as horizontal and vertical snapping guidelines corresponding to edges of the bounding border 124 of the object region boundary. The snapping guidelines 140 also determines the external edge snapping guidelines corresponding to the object external edges 216 around the object, and determines the feature edge snapping guidelines corresponding to the object feature edges 218 of the object.

Figure 10:
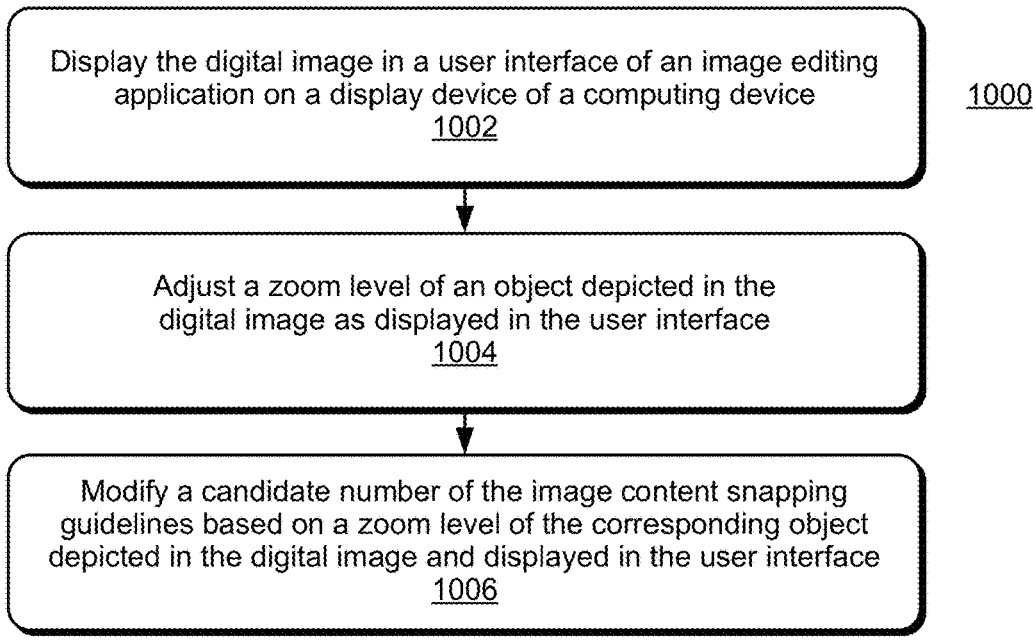

FIG. 10 illustrates example method(s) 1000 for image content snapping guidelines, and is generally described with reference to the guidelines segmentation system implemented by a computing device as shown and described with reference to FIGS. 1-8. The order in which the method is described is not intended to be construed as a limitation, and any number or combination of the method operations can be combined in any order to implement a method, or an alternate method.

At 1002, the digital image is displayed in a user interface of an image editing application on a display device of a computing device. For example, the user interface 110 of the image editing application 108 displays the digital image 106 for user editing and design.

At 1004, a zoom level of an object depicted in the digital image is adjusted as displayed in the user interface. For example, the zoom level of an object depicted in the digital image 106 that is displayed in the user interface 110 can be adjusted, such as based on a user input to adjust the zoom level display of the object. A designer may increase or decrease the zoom level of the digital image 106 as displayed in the user interface 110 of the image editing application 108, such as for detail accuracy and convenience when working on and designing the image, and the bounding borders 124 and the image content snapping guidelines 142 are adaptive to the varying zoom levels.

At 1006, a candidate number of the image content snapping guidelines is modified based on a zoom level of the corresponding object depicted in the digital image and displayed in the user interface. For example, the image content snapping guidelines 142 for a respective segmented object 132 are maintained in the guidelines database 154, and the guidelines segmentation system 104 can modify the candidate number of the image content snapping guidelines 142 based on the zoom level of the corresponding object displayed in the user interface 110 of the image editing application 108. In implementations, the bounding borders 124 and the image content snapping guidelines 142 can be utilized at any zoom level of the objects 122 in the digital image. Accordingly, depending on the zoom level of the image 106, a candidate number of the image content snapping guidelines 142 is modified based on the zoom level, where the number of image content snapping guidelines may increase or decrease. For example, the image content snapping guidelines 142 that are significant at a current zoom level may become insignificant (e.g., too small or too big to display) at an adjusted zoom level, while previously insignificant image content snapping guidelines 142 may become significant at the newly adjusted zoom level.

Figure 11:
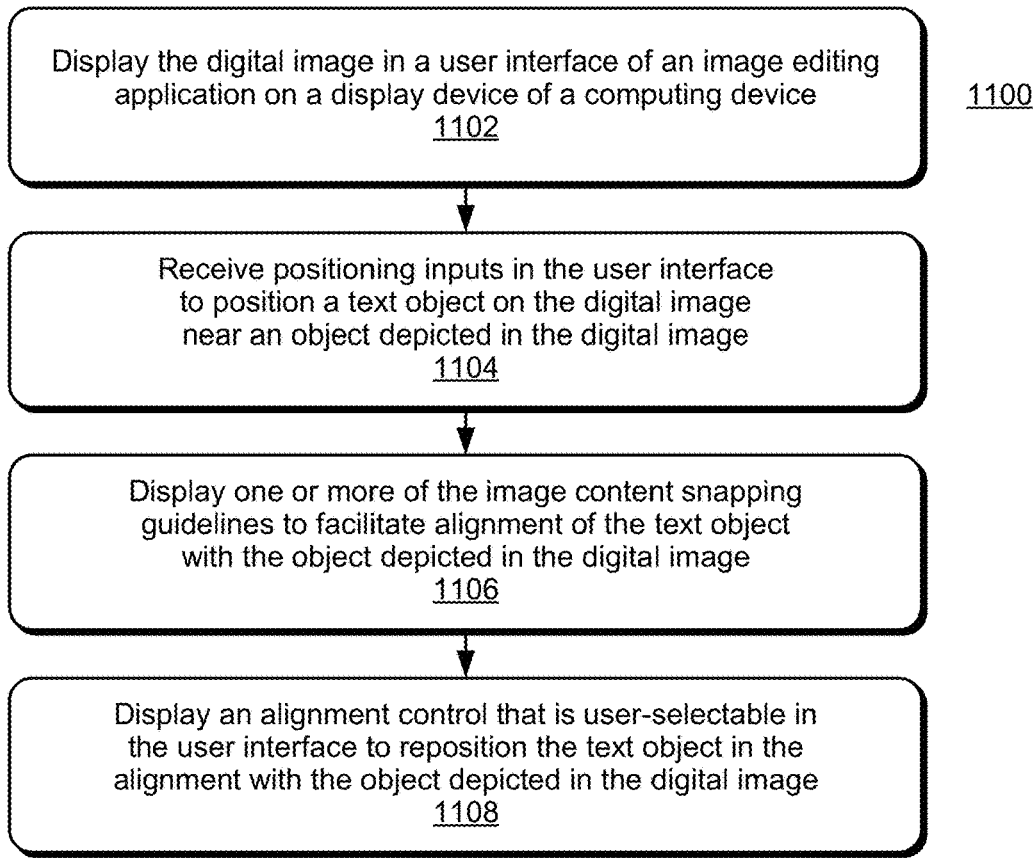

FIG. 11 illustrates example method(s) 1100 for image content snapping guidelines, and is generally described with reference to the guidelines segmentation system implemented by a computing device as shown and described with reference to FIGS. 1-8. The order in which the method is described is not intended to be construed as a limitation, and any number or combination of the method operations can be combined in any order to implement a method, or an alternate method.

At 1102, the digital image is displayed in a user interface of an image editing application on a display device of a computing device. For example, the user interface 110 of the image editing application 108 displays the digital image 106 for user editing and design.

At 1104, positioning inputs are received in the user interface to position a text object on the digital image near an object depicted in the digital image. For example, the image editing application 108 receives positioning inputs in the user interface, such as user inputs, to position a text object on the digital image 106 near an object 122 depicted in the digital image. In implementations, a designer may move a text object with a mouse, a stylus, by touch control, and/or by any other input technique to position the text object in approximate alignment and position to add the text over a digital image and near an object depicted in the digital image.

At 1106, one or more of the image content snapping guidelines are displayed to facilitate alignment of the text object with the object depicted in the digital image. For example, the image editing application 108 and/or the guidelines segmentation system 104 initiates to display one or more of the image content snapping guidelines 142 to facilitate alignment of a text object 710 with an object 704 depicted in the digital image 702. In implementations, the text object 710 is delineated by the text bounding box 712, and an image content snapping guideline 706 is displayed if an edge of the text bounding box 712 aligns with the image content snapping guideline. For example, the system detects alignment of the y-coordinates to match the y-coordinate of the text object 710 with the y-coordinate of the image content snapping guideline 706. Alternatively, the image content snapping guidelines may not be displayed on the user interface over a digital image, but rather are utilized to snap and align a text object without displaying the image content snapping guideline.

At 1108, an alignment control that is user-selectable is displayed in the user interface to reposition the text object in the alignment with the object depicted in the digital image. For example, the image editing application 108 and/or the guidelines segmentation system 104 initiates to display an image content snapping guideline 706 if an edge of the text bounding box 712 is proximate the image content snapping guideline 706, and an alignment control 716 that is user-selectable is displayed in the user interface 110 to reposition the text object 710 in rotation and/or parallel alignment with the object depicted 704 in the digital image 702.

Figure 12:
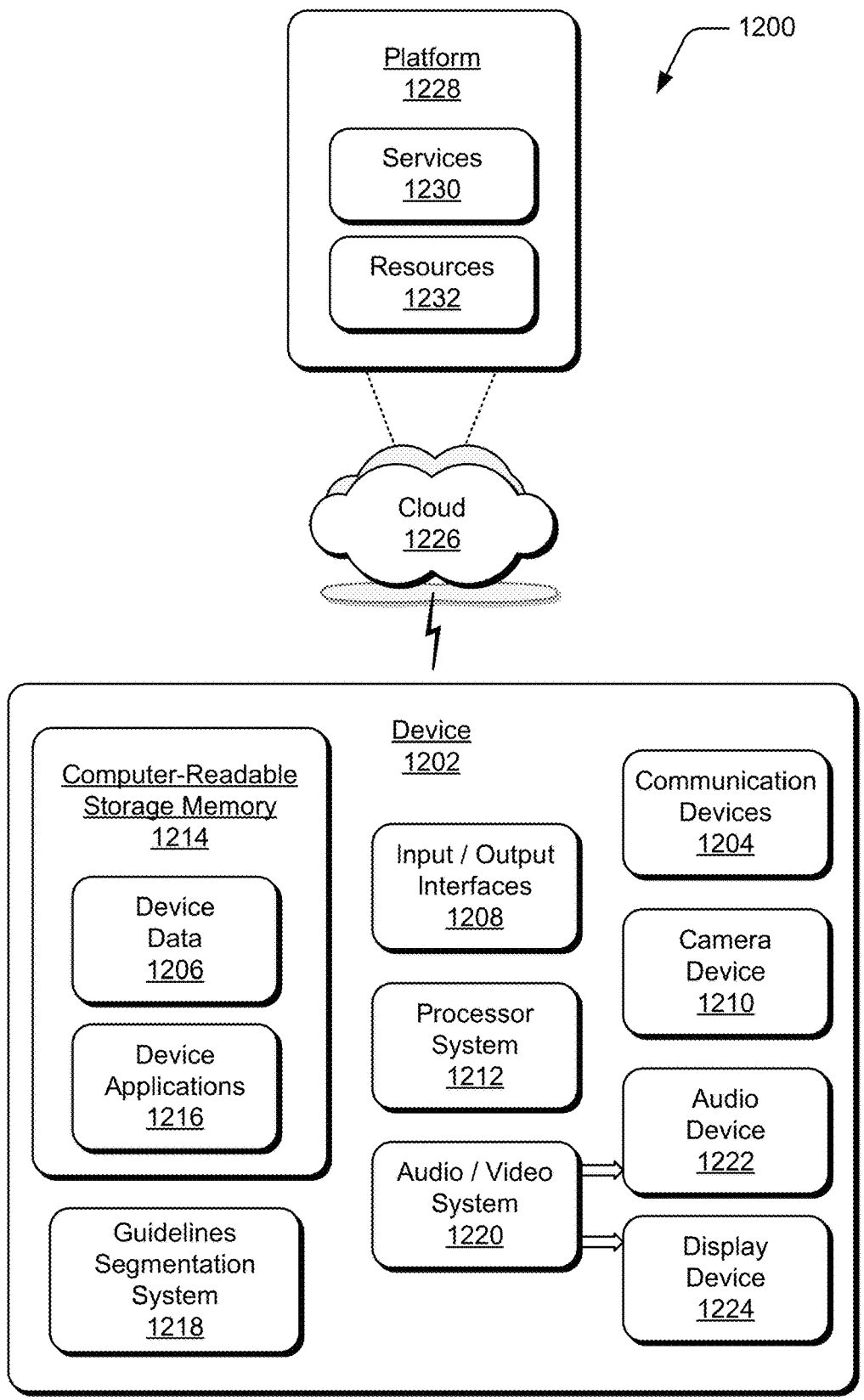
FIG. 12 illustrates an example system with an example device that can implement aspects of the techniques for image content snapping guidelines.

FIG. 12 illustrates an example system 1200 that includes an example device 1202, which can implement techniques of image content snapping guidelines. The example device 1202 can be implemented as any of the computing devices, mobile devices, server devices, and/or services described with reference to the previous FIGS. 1-11, such as any type of computing device, client device, mobile phone, tablet, communication, entertainment, gaming, media playback, and/or other type of device. For example, the computing device 102 may be implemented as the example device 1202.

The example device 1202 includes communication devices 1204 that enable wired and/or wireless communication of device data 1206, such as any of the digital image data and/or guidelines segmentation system data, as well as computer applications data and content that is transferred from one computing device to another, and/or synched between multiple computing devices. The device data 1206 can include any type of audio, video, image, and/or graphic data that is received and/or generated by applications executing on the device. The communication devices 1204 can also include transceivers for cellular phone communication and/or for network data communication.

The device 1202 also includes input/output (I/O) interfaces 1208, such as data network interfaces that provide connection and/or communication links between the device, data networks, and other devices. The I/O interfaces can be used to couple the device to any type of components, peripherals, and/or accessory devices, such as a digital camera device 1210 and/or computer input device that may be integrated with the example device 1202. The I/O interfaces also include data input ports via which any type of data, media content, and/or inputs can be received, such as user inputs to the device, as well as any type of audio, video, and/or image data received from any content and/or data source.

The device 1202 includes a processor system 1212 that may be implemented at least partially in hardware, such as with any type of microprocessors, controllers, and the like that process executable instructions. The processor system 1212 can include components of an integrated circuit, programmable logic device, a logic device formed using one or more semiconductors, and other implementations in silicon and/or hardware, such as a processor and memory system implemented as a system-on-chip (SoC). Alternatively or in addition, the device 1202 can be implemented with any one or combination of software, hardware, firmware, or fixed logic circuitry that may be implemented with processing and control circuits. The device 1202 may further include any type of a system bus or other data and command transfer system that couples the various components within the device. A system bus can include any one or combination of different bus structures and architectures, as well as control and data lines.

The example device 1202 also includes computer-readable storage memory 1214, such as data storage devices implemented in hardware that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory 1214 can include various implementations of random access memory (RAM), read-only memory (ROM), flash memory, and other types of storage memory in various memory device configurations.

The computer-readable storage memory 1214 provides storage of the device data 1206 and various device applications 1216, such as an operating system that is maintained as a software application with the computer-readable storage memory and executed by the processor system 1212. In this example, the device 1202 includes a guidelines segmentation system 1218 that implements the described techniques of image content snapping guidelines, and may be implemented with hardware components and/or in software as one of the device applications 1216, such as when the example device 1202 is implemented as the computing device 102 shown and described with reference to FIGS. 1-11. An example of the guidelines segmentation system 1218 includes the guidelines segmentation system 104 that is implemented as a software application, modules, components, firmware, and/or as hardware components by the computing device 102 as described with reference to FIGS. 1-11. In implementations, the guidelines segmentation system 1218 may include independent processing, memory, and logic components as a computing and/or electronic device integrated with the device 1202.

The device 1202 also includes an audio and/or video system 1220 that generates audio data for an audio device 1222 and/or generates display data for a display device 1224. The audio device and/or the display device include any devices that process, display, and/or otherwise render audio, video, display, and/or image data. In implementations, the audio device and/or the display device are integrated components of the example device 1202. Alternatively, the audio device and/or the display device are external, peripheral components to the example device. In embodiments, at least part of the techniques described for image content snapping guidelines may be implemented in a distributed system, such as over a "cloud" 1226 in a platform 1228. The cloud 1226 includes and/or is representative of the platform 1228 for services 1230 and/or resources 1232.

The platform 1228 abstracts underlying functionality of hardware, such as server devices (e.g., included in the services 1230) and/or software resources (e.g., included as the resources 1232), and connects the example device 1202 with other devices, servers, etc. The resources 1232 may also include applications and/or data that can be utilized while computer processing is executed on servers that are remote from the example device 1202. Additionally, the services 1230 and/or the resources 1232 may facilitate subscriber network services, such as over the Internet, a cellular network, or Wi-Fi network. The platform 1228 may also serve to abstract and scale resources to service a demand for the resources 1232 that are implemented via the platform, such as in an interconnected device embodiment with functionality distributed throughout the system 1200. For example, the functionality may be implemented in part at the example device 1202 as well as via the platform 1228 that abstracts the functionality of the cloud 1226.

Although implementations of image content snapping guidelines have been described in language specific to features and/or methods, the appended claims are not necessarily limited to the specific features or methods described. Rather, the specific features and methods are disclosed as example implementations of image content snapping guidelines, and other equivalent features and methods are intended to be within the scope of the appended claims. Further, various different examples are described and it is to be appreciated that each described example can be implemented independently or in connection with one or more other described examples.

The invention claimed is:

1. A computing device implemented for image content snapping guidelines, the computing device comprising:
 a memory to maintain a digital image and a guidelines database of image content snapping guidelines corresponding to features of one or more objects depicted in the digital image, an image content snapping guideline being displayable to facilitate alignment of an additional object in response to detection of an object insertion position of the additional object in the digital image; and
 a guidelines segmentation system implemented at least partially in computer hardware, the guidelines segmentation system including:
  an object segmentation module configured to segment the one or more objects depicted in the digital image, each of the one or more objects identified by a bounding border that delineates an object region boundary, the one or more objects including background features in the digital image;

an edge detection module configured to receive a segmented object of each of the one or more objects identified in the digital image, and determine object external edges and object internal edges from the segmented object for each of the one or more objects; and a snapping guidelines module configured to determine the image content snapping guidelines for each of the one or more objects depicted in the digital image, the image content snapping guidelines for an object determined based on the bounding border of the object region boundary, the object external edges, and the object internal edges.

2. The computing device of claim 1, wherein the digital image is formatted as a raster-based graphic image.

3. The computing device of claim 1, wherein the guidelines segmentation system comprises an image pre-processing module configured to:

determine an image size of the digital image prior to the object segmentation and the edge detection; and reduce the image size of the digital image to an image size threshold if the image size exceeds the image size threshold.

4. The computing device of claim 1, wherein the edge detection module is configured to:

receive the segmented object of an object identified in the digital image;

determine the object external edges as approximate straight-line external edges around the object within the bounding border of the object region boundary; and determine the object internal edges as approximate straight-line internal edges of the object.

5. The computing device of claim 1, wherein the snapping guidelines module is configured to:

determine bounding border snapping guidelines as horizontal and vertical snapping guidelines corresponding to edges of the bounding border of the object region boundary;

determine external edge snapping guidelines corresponding to the object external edges around the object; and determine feature edge snapping guidelines corresponding to the object internal edges of the object.

6. The computing device of claim 1, wherein:

the edge detection module is configured to identify object corners of an object depicted in the digital image; and the snapping guidelines module is configured to determine the image content snapping guidelines including projected snapping guidelines that extend from the object corners of the object.

7. The computing device of claim 1, wherein:

the guidelines database maintains the image content snapping guidelines for each of the one or more objects as determined by the snapping guidelines module; and a candidate number of the image content snapping guidelines is modified based on a zoom level of the corresponding object in the digital image displayed in a user interface on a display device of the computing device.

8. The computing device of claim 1, wherein:

the edge detection module is configured to identify the background features in the digital image not detected and segmented by the object segmentation module; and the snapping guidelines module is configured to determine the image content snapping guidelines including background feature snapping guidelines.

9. The computing device of claim 1, further comprising an image editing application implemented at least partially in the computer hardware, the image editing application configured to:

receive positioning inputs in a user interface to position a text object on the digital image near an object depicted in the digital image; and initiate displaying one or more of the image content snapping guidelines to facilitate alignment of the text object with the object depicted in the digital image.

10. The computing device of claim 9, wherein:

the text object is delineated by a text border; and an image content snapping guideline is displayed if an edge of the text border aligns with an image content snapping guideline.

11. The computing device of claim 9, wherein:

the text object is delineated by a text border;

an image content snapping guideline is displayed if an edge of the text border is proximate an image content snapping guideline; and the image editing application configured to initiate displaying an alignment control that is user-selectable in the user interface to reposition the text object in the alignment with the object depicted in the digital image.

12. A method implemented by a computing device in a digital medium environment for image content snapping guidelines, the method comprising:

receiving an input of a digital image depicting one or more objects as image content;

segmenting the one or more objects depicted in the digital image, the segmenting generating a bounding border that delineates an object region boundary of each of the one or more objects, the one or more objects including background features in the digital image;

determining object external edges of each of the one or more objects identified in the digital image;

determining object internal edges of each of the one or more objects identified in the digital image; and determining image content snapping guidelines for each of the one or more objects depicted in the digital image, the image content snapping guidelines for an object determined based on the bounding border of the object region boundary, the object external edges, and the object internal edges, and an image content snapping guideline being displayable to facilitate alignment of an additional object in response to detection of an object insertion position of the additional object in the digital image.

13. The method of claim 12, wherein the digital image is formatted as a raster-based graphic image.

14. The method of claim 12, further comprising:

reducing an image size of the digital image if the image size exceeds an image size threshold, the reducing the image size including determining the image size of the digital image prior to the segmenting the one or more objects depicted in the digital image.

15. The method of claim 12, wherein:

the object external edges of an object are determined as approximate straight line external edges around the object within the bounding border of the object region boundary; and the object internal edges of the object are determined as approximate straight-line internal edges of the object.

16. The method of claim 12, wherein the determining the image content snapping guidelines includes:

determining bounding border snapping guidelines as horizontal and vertical snapping guidelines corresponding to edges of the bounding border of the object region boundary;

determining external edge snapping guidelines corresponding to the object external edges around the object; and determining feature edge snapping guidelines corresponding to the object internal edges of the object.

17. The method of claim 12, further comprising:

identifying object corners of an object depicted in the digital image; and the determining the image content snapping guidelines includes determining projected snapping guidelines that extend from the object corners of the object.

18. The method of claim 12, further comprising:

maintaining the image content snapping guidelines for each of the one or more objects in a guidelines database; and modifying a candidate number of the image content snapping guidelines based on a zoom level of a corresponding object in the digital image displayed in a user interface on a display device of the computing device.

19. The method of claim 12, further comprising:

identifying the background features in the digital image not detected and segmented by the segmenting; and the determining the image content snapping guidelines includes determining background feature snapping guidelines.

20. In a digital medium environment, a guidelines segmentation system implemented for image content snapping guidelines, the guidelines segmentation system comprising:

an image pre-processing module configured to determine an image size of a digital image formatted as a raster-based graphic image, and reduce the image size of the digital image to an image size threshold if the image size exceeds the image size threshold;

an object segmentation module configured to segment one or more objects depicted in the digital image, the one or more objects each identified by a bounding border that delineates an object region boundary, the one or more objects including background features in the digital image;

an edge detection module configured to receive a segmented object of the one or more objects identified in the digital image, and determine object external edges, object internal edges, and object corners of an object from the segmented object; and a snapping guidelines module configured to determine image content snapping guidelines of the object depicted in the digital image, the image content snapping guidelines for the object determined based on the bounding border of the object region boundary, the object external edges, the object internal edges, and projected snapping guidelines that extend from the object corners of the object, and an image content snapping guideline being displayable to facilitate alignment of an additional object in response to detection of an object insertion position of the additional object in the digital image.

\* \* \* \* \*